3,433,817
DIALKYLAMINODIALANES AND A PROCESS FOR PREPARING THEM
Archie R. Young II, Montclair, and Robert Ehrlich, Morristown, N.J., assignors, by mesne assignments, to the United States of America as represented by the Secretary of the Air Force
No Drawing. Filed Sept. 29, 1964, Ser. No. 400,210
U.S. Cl. 260—448
Int. Cl. C07f 5/02, 5/06; C07c 87/127
9 Claims This invention concerns derivatives of metallic hydrides and to a process for preparing them.

More particularly, this invention relates to derivatives of dialane ($Al_2H_6$) useful as intermediates in the preparation of higher alanes, polymer intermediates and as promoters or catalysts for olefin polymerization. These derivatives are included within the formula:

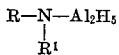

wherein R and $R^1$ which can be the same or different at any given time, are straight chain aliphatic groups having 1 or more carbon atoms.

Aluminum and boron are both considered as Group III elements of the Periodic Table. As a consequence of this grouping, their chemistry is the same in some respects. For example, both elements are capable of forming various hydrides including $X_2H_6$ where X is the element in question. However, where diborane $B_2H_6$ has been known for a long period of time and is the most common of the boron hydrides, dialane $Al_2H_6$ the analogous aluminum hydride is unknown. In fact, the most common form of any aluminum hydride is the Lewis base complexes of $AlH_3$ Dialane or derivatives of it are of interest as a means of preparing more complex alanes and as a means of introducing the aluminum hydride moiety into inorganic and organic molecules and as all hydrides of this type as selective reducing agents. These reducing agents would be valuable because they are vigorous reducing agents, yet are stable enough to use without more than routine precaution. Because of their widespread potential applications the preparation of dialane or stable derivatives would be a substantial advance in aluminum chemistry.

It is an object of this invention, therefore, to prepare stable dialane derivatives.

Another object of this invention is to prepare novel reducing agents and polymerization catalysts.

Additional objects are the preparation of intermediates for introducing the dialane moiety into inorganic and organic molecules.

Further objects will become apparent to those skilled in the art after a perusal of this patent application.

The above objects among others are achieved by either of two preparative processes. In one instance, the process involves reacting a dialkylaminohaloalane reactant with an alkali metal aluminum tetrahydride reactant most conveniently in the presence of inert solvent. The reaction proceeds rapidly in most instances producing a precipitate of alkali metal halide and leaving the product in the inert solvent solution. The product can be recovered by stripping off inert solvent, solvent extraction, cooling or the like. The products are stable, ether-soluble solids.

The preparation of the novel products of this invention by the first process can be represented by the reaction below:

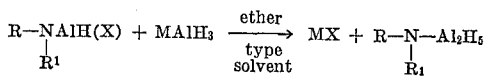

wherein R and $R^1$ are straight chain aliphatic radicals having from 1 to 8 carbon atoms preferably from 1 to 4 carbon atoms, M is an alkali metal and X is a halogen preferably chlorine.

As indicated above, the dialkylaminohaloalane reactant can be varied to some extent. For example, dimethylaminochloroalane, diethylaminochloroalane, di-n-propylaminochloroalane and di-isopropylaminochloroalane are satisfactory reactants. Also satisfactory are the reactants having different aliphatic substituents such as methylethylaminochloroalane, methyl-n-propylaminochloroalane and the like. However, the reactants having different straight chain aliphatic substituents are tedious to prepare and are not commercially available. Similarly the "bromoalanes" such as dimethylaminobromoalane are satisfactory reactants but these are more difficult to prepare and are less preferred. The reactants having alkyl substituents above 4, particularly above 8, are very sluggish as reactants, presumably because of steric hindrance and are thus not preferred.

The favored alkalimetalaluminum tetrahydride reactant is sodium aluminum tetrahydride. This reactant is preferred because of its good solubility in the inert solvents used as reaction media. However, the potassium and lithium aluminum hydrides can be employed if desired by using larger quantities of solvent or mixtures of solvent.

Ethers are the preferred solvents of this inventive process. The dialkyl ethers such as diethyl ether, dipropyl ether, the dibutyl ethers, the ethylpropyl ethers, and the like can be used. Certain heterocyclic ethers such as tetrahydrofuran and its homologues are also good solvents for the reaction. In addition, the dialkyl ethers of ethylene glycol and their derivatives can be used as solvents by themselves or mixed with the dialkylethers or heterocyclic ethers. These dialkyl ethers of ethylene glycol include ethylene glycol dimethylether, ethylene glycol diethyl ether, etc. The quantity of ether used is not important as long as sufficient solvent is used to solubilize and substantially dissolve the reactants.

The reaction is commonly run at moderate temperatures about 20–50° C. but can be run at a wider range of temperatures, that is, from about 0° to 80° C. However, the lower temperatures unnecessarily slow down the reaction rate, while temperatures much above 50° C. tend to be too vigorous for safety and promote competing side reactions and the formation of decomposition products.

The reaction is best run under atmospheric or near atmospheric pressure conditions. However, higher pressures can be used but offer no apparent advantage.

The ratio of reactants preferred is that of stoichiometry, i.e., equimolar. However, this ratio can be increased or decreased as much as 35% without affecting operability, although separation problems are increased to some extent.

As previously described reaction time is rapid; in most instances within minutes of the mixing of the reactants. The formation of the alkali metal salt is a visual indicator of the completeness of the reaction. Ordinarily the reaction is brought about by mixing solutions of the two reactants in a convenient mixing vessel in an inert atmosphere. The order of addition of the reactants is immaterial.

To more clearly indicate the workings of this invention, the following illustrative embodiments are submitted.

Equimolar quantities of dimethylaminochloroalane $(CH_3)_2NAlH(Cl)$ and lithium aluminum hydride ($LiAlH_4$) are reacted in tetrahydrofuran (THF) at room temperature. Lithium chloride precipitates out leaving the product in the tetrahydrofuran layer. Pentane (½ the volume of THF) is added to the filtrate. The THF is stripped off, leaving a relatively chloride-free solid corresponding to the formula: $(CH_3)_2NAl_2H_5$. Elemental analysis and molecular weight determinations confirm that the expected product is present.

In another embodiment, the same product

[(CH$_3$)$_2$NAl$_2$H$_5$]

is prepared reacting equimolar quantities of potassium aluminum hydride and (CH$_3$)$_2$NAlH(Br) in excess tetrahydrofuran at room temperature. The precipitated KBr is filtered off and pentane (½ the volume of tetrahydrofuran) is added to precipitate the product from the tetrahydrofuran solution. Again analysis confirms the identity of the product.

In a further embodiment the product [(C$_2$H$_5$)$_2$NAl$^2$H$_5$] is prepared by reacting the diethylether solutions of equimolar quantities of lithium aluminum tetrahydride and (C$_2$H$_5$)$_2$NAlH(Cl) at room temperature. LiCl precipitates out and is removed. The product is isolated as the diethyl ether complex (C$_2$H$_5$)$_2$NAl$_2$H$_5$·O(C$_2$H$_5$)$_2$.

In another embodiment, equimolar quantities of NaAlH$_4$ and CH$_3$(C$_2$H$_5$)NAlH(Cl) in the form of their THF solutions are reacted at room temperature. The precipitated salt is filtered off and the pentane is added to the THF solution containing product in the form of its THF complex, to precipitate the compound. The product (CH$_3$)C$_2$H$_5$NAl$_2$H$_5$ is filtered off and dried in vacuo to give a final product. Analysis confirms the expected product is obtained.

In a further embodiment, the product (n-C$_4$H$_9$)$_2$NAl$_2$H$_5$ is prepared by reacting equimolar solutions of sodium aluminum hydride and (n-C$_4$H$_9$)$_2$NAlH(Cl) in THF at room temperature. The precipitate of NaCl is removed leaving the THF complex, (n-C$_4$H$_9$)$_2$NAl$_2$H$_5$·THF in the solvent. Sufficient pentane is added (½ the volume of THF) to precipitate the product from its complex. The product is filtered and dried in vacuo to produce the final product.

Another aspect of this invention is the preparation of the products of this invention by the reaction of a dialkylaminoalane with a dialkyl ether complex of aluminum hydride. The reaction is performed in a predominantly non-ether solvent such as benzene, toluene, xylene, cyclohexane, etc., with sufficient dialkyl ether added to solubilize the reactants. Ordinarily, the ether content is kept below the 20–30% so that the ether complex does not precipitate. The reaction conditions such as temperature, pressure ratio of reactants, etc. are as described before for the first preparation process. The process proceeds as indicated below:

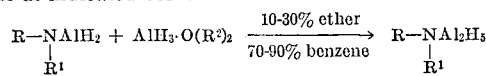

wherein R, R$^1$ and R$^2$ which can be the same or different are straight chain aliphatic radicals preferably having 1 up to and including 4 carbon atoms.

The following embodiments are submitted to illustrate this aspect of the invention.

Equimolar quantities of di-n-propylaminoalane

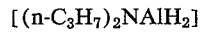

and alane diethyl ether [AlH$_3$·O(C$_2$H$_5$)$_2$] dissolved in a 20 part by weight diethyl ether—80 parts by weight benzene solvent mixture. No precipitate appears and the reaction mixture is freeze dried to yield the product (n-C$_3$H$_7$)$_2$NAl$_2$H$_5$, uncomplexed.

The reactants of these two inventive processes are known compositions. For example, the alkali metal tetrahydrites such as LiAlH$_4$ and NaAlH$_4$ are available in commercial quantities or can be made utilizing known procedures described in Inorganic Synthesis, Chemical Abstracts, etc.

The dialkylaminohaloalane reactants used in the first described process are known compounds which can be prepared among other ways by the method of J. K. Ruff, J. Am. Chem. Soc., 83,1798 (1961). This method involves reacting HgCl$_2$ and a dialkylaminoalane such as (CH$_3$)$_2$NAlH$_2$ in THF solvent at −80° C. For example, the product (CH$_3$)$_2$N—AlH(Cl) is produced from the afore-described reactants. The higher homologues are prepared using the higher dialkylaminoalanes.

The dialkylaminoalane reactants are prepared by the method of J. K. Ruff, et al., described in J. Am. Chem. Soc., 82, 2141 (1960). For example, dimethylaminoalane is prepared by reacting equimolar quantities of LiAlH$_4$ and (CH$_3$)$_2$NH$_2$Cl. The aluminum hydride ether complexes are known compositions and are made by reacting LiAlH$_4$ with AlCl$_3$ in the appropriate ether.

To better indicate the workings of this invention in the greatest possible detail, the following examples are submitted.

EXAMPLE 1

Preparation of dimethylaminodialane in a THF media (A) Preparation of dimethylaminochloralane.—To a chilled solution of 7.3 g. of Me$_2$NAlH$_2$ in 150 ml. of benzene under nitrogen is carefully added 13.6 g. of HgCl$_2$. Reaction is vigorous and rapid and a total of 1.11 l. of hydrogen is evolved and 10.0 g. of mercury is formed. The mercury is removed and the benzene solution is evaporated to dryness in vacuo at room temperature to give 10.6 g. (98.6%) of Me$_2$NAl(H)Cl as a white solid, M.P. 81–83°.

Anal.—Calc. for C$_2$H$_7$AlClN: Al, 25.13; Cl, 32.98; Active H, 0.929. Found: Al, 24.92; Cl, 32.59; Active H, 0.924.

(B) Preparation of Product.—A solution of 10.75 g. of Me$_2$NAl(H)Cl in 100 ml. of THF is added to a stirred solution of 5.40 g. of NaAlH$_4$ in 100 ml. of THF. Precipitation of NaCl (5.80 g.) is immediate on addition. The mixture is stirred 30 minutes at room temperature, filtered and the chloride-free THF filtrate evaporated to dryness to give 17.30 g. of Me$_2$NAl$_2$H$_5$·THF.

Anal.—Calc. for Me$_2$NAl$_2$H$_5$·THF: Al, 30.80; active H, 2.88; H/Al, 2.50. Found: Al, 31.00; active H, 2.77; H/Al, 2.35.

The associated THF could be removed by dissolving the complex in THF (1.75 g. in 10 ml. THF) and precipitating the solvent-free Me$_2$NAl$_2$H$_5$ by the addition of excess pentane (100 ml.).

EXAMPLE 2

Preparation of dimethylaminodialane diethyl ether complex (A) Preparation of dimethylaminoalane.—Approximately 60 g. of powdered LiAlH$_4$ is suspended in 700 ml. of benzene and 82 g. of Me$_2$NH$_2$Cl is added slowly at room temperature. Gas evolution starts after an induction period of about 15 minutes. After gas evolution (45.2 l.) is complete the mixture is stirred over night at 55° under a nitrogen flush. The residual solids are filtered and the chloride-free benzene filtrate is freeze-dried to give 61.43 g. of Me$_2$NAlH$_2$ (85% yield), identified by comparison to an authentic sample.

(B) Preparation of product complex.—In a suitable reaction vessel equipped with heating, cooling and stirring means is added equimolar amounts of dimethylaminoalane and diethyl ether alane in excess diethylether. No precipitation of the expected AlH$_3$·O(C$_2$H$_5$) takes place. After 30 minutes stirring, the diethyl ether solvent is evaporated off under vacuum leaving a white solid residue. The following data confirmed that the complex

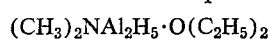

is present.

Anal.—Calcd. for (CH$_3$)$_2$NAl$_2$H$_5$·O(C$_2$H$_5$)$_2$: Al, 30.45; active H, 2.84; N, 7.90; H/Al, 2.50. Found: Al, 30.20; active H, 2.70; N, 8.20; H/Al, 2.50.

The molecular weight, determined ebullioscopically in diethyl ether was 127±13 compared to a calculated value of 103 for (CH$_3$)$_2$NAl$_2$H$_5$ or a value of 51 calculated for an equimolar mixture of alane and dimethylaminoalane. The associated ether could not be removed from the solid either at room temperature or at 66° in a vacuum.

EXAMPLE 3

Preparation of dimethylaminodialane in the form of the uncomplexed product (A) Preparation of dimethylaminoalane.—The same procedure described in Example 2A is followed.

(B) Preparation of uncomplexed product.—In a suitable sized reaction vessel equipped with heating, cooling and stirring means is added equimolar amounts of dimethylaminoalane and diethyl ether alane in a 20 parts by weight diethyl ether—80 parts by weight benzene mixture. After 30 minutes stirring the reaction mixture is freeze-dried to yield solvent-free dimethylaminodialane, $(CH_3)_2NAl_2H_5$. This product is dried at room temperature for 20 hours to yield a material having the analysis and properties described below.

*Analysis.*—Calcd. for $(CH_3)_2NAl_2H_5$: Al, 52.35; active H, 4.89; H/Al, 2.5. Found: Al, 52.88; active H, 5.18; H/Al, 2.6.

$(CH_3)_2NAl_2H_5$ in THF showed the Al-H absorption in the infrared at 1725 cm.$^{-1}$ as compared to 1802 cm.$^{-1}$ for $(CH_3)_2NAlH_2$ in THF. In benzene, the former absorbed at 1802 cm.$^{-1}$.

$(CH_3)_2NAl_2H_5$ was monomeric in both THF and benzene while $(CH_3)_2NAlH_2$ is trimeric in benzene.

No $(CH_3)_2NAlH_2$ could be sublimed from $$(CH_3)_2NAl_2H_5$$

up to 80°, although $(CH_3)_2NAlH_2$ could be sublimed readily at 40° from a mixture of it and $AlH_3 \cdot O(C_2H_5)_2$.

The X-ray diffraction pattern of the ether complex is unique and different from that of $(CH_3)_2NAlH_2$ given supra in the following table.

TABLE.—MAJOR X-RAY DIFFRACTION LINES OF $(CH_3)_2NAl_2H_5$ AND $(CH_3)_2NAlH_2$

| $(CH_3)_2NAl_2H_5$ | | $(CH_3)_2NAlH_5$ | |
| --- | --- | --- | --- |
| d(A.) | I/I$_o$ | d(A.) | I/I$_o$ |
| 4.47 | 20 | 2.91 | 30 |
| 3.85 | 100 | 2.66 | 20 |
| 3.64 | 20 | 2.44 | 20 |
| 3.30 | 70 | 2.32 | 20 |
| 3.23 | 70 | 2.23 | 20 |
| 2.99 | 30 | 2.14 | 20 |

| $(CH_3)_2NAl_2H_2$ | | $(CH_3)_2NAlH_2$ | |
| --- | --- | --- | --- |
| d(A.) | I/I$_o$ | d(A.) | I/I$_o$ |
| 7.31 | 100 | 3.04 | 10 |
| 6.41 | 5 | 2.79 | 10 |
| 5.94 | 100 | 2.57 | 10 |
| 5.68 | 100 | 2.48 | 10 |
| 5.30 | 60 | 2.29 | 10 |
| 2.75 | 90 | 2.16 | 10 |
| 3.64 | 5 | 2.11 | 10 |
| 3.50 | 5 | 2.05 | 5 |
| 3.40 | 20 | 1.94 | 5 |
| 3.12 | 10 | 1.74 | 5 |

We claim:

1. Dialane derivatives of the formula:

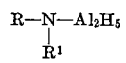

wherein R and R$^1$ are straight chain aliphatic radicals having from 1 up to and including 8 carbon atoms.

2. $(CH_3)_2N$—$Al_2H_5$
3. $(C_2H_5)_2N$—$Al_2H_5$
4. $(n-C_3H_7)_2N$—$Al_2H_5$
5. $(n-C_4H_9)_2N$—$Al_2H_5$
6. $CH_3(C_2H_5)N$—$Al_2H_5$

7. A process for preparing a dialane product of the formula:

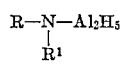

wherein R and R$^1$ are straight chain aliphatic radicals having from 1 up to and including 8 carbon atoms, comprising the steps of contacting an alkali metal aluminum tetrahydride reactant with a dialkylaminohaloalane reactant in the presence of an ether solvent until an alkali metal halide precipitates out, removing the precipitated alkali metal halide and adding a sufficient quantity of non-ether organic solvent to precipitate the dialane product, said organic solvent being selected from the group consisting of aliphatic and aromatic hydrocarbons.

8. The process of claim 7 in which the reaction is run at a temperature ranging from 20° C. to 50° C.

9. The process of claim 8 in which the reaction is run at near atmospheric pressure conditions.

References Cited

UNITED STATES PATENTS 3,255,169   6/1966   Kearby _____ 260—448 XR

OTHER REFERENCES

Ruff et al., JACS, vol. 82, pp. 2141–44 (1960).
Moeller, Inorganic Chemistry, John Wiley & Sons, Inc., New York (1952), pp. 742–796.
Atti Lincei, (6A) (1925), pp. 229–232.

TOBIAS E. LEVOW, *Primary Examiner.*

H. M. S. SNEED, *Assistant Examiner.*

U.S. Cl. X.R.

252—431; 260—346.1